(12) United States Patent
Shifferaw

(10) Patent No.: US 8,720,678 B2
(45) Date of Patent: May 13, 2014

(54) CELL PHONE CRADLE

(76) Inventor: Tessema Dosho Shifferaw, Albany, CA (US)

( * ) Notice: Subject to any disclaimer, the term of this patent is extended or adjusted under 35 U.S.C. 154(b) by 131 days.

(21) Appl. No.: 13/212,090

(22) Filed: Aug. 17, 2011

(65) Prior Publication Data

US 2013/0043243 A1 Feb. 21, 2013

(51) Int. Cl.
*B65D 77/00* (2006.01)
(52) U.S. Cl.
USPC ............... 206/218; 455/575.1; 455/575.8; 206/760; 206/762
(58) Field of Classification Search
USPC ........ 206/305, 756, 759, 760, 762, 45, 45.24, 206/218; 455/575, 575.8; 220/8
See application file for complete search history.

(56) References Cited

U.S. PATENT DOCUMENTS 5,664,015 A * 9/1997 Ford et al. ............... 379/433.01
D644,840 S * 9/2011 Eskandry ...................... D3/305

* cited by examiner

*Primary Examiner* — J. Gregory Pickett
*Assistant Examiner* — Raven Collins
(74) *Attorney, Agent, or Firm* — Edward S. Wright

(57) ABSTRACT

Cell phone cradle that keeps a cell phone away from the head when it is held up to the ear. The cradle has a first end with a height corresponding to the thickness of the cell phone, a second end with a height substantially greater than the thickness of the cell phone, and tapered sides forming an enclosure having an open top and a depth which increases from one end to the other. The cell phone is placed in the cradle with the speaker in the deeper end so that the cell phone is spaced away from the head when the open side of the enclosure is held against the head with the speaker opposite the ear.

9 Claims, 4 Drawing Sheets

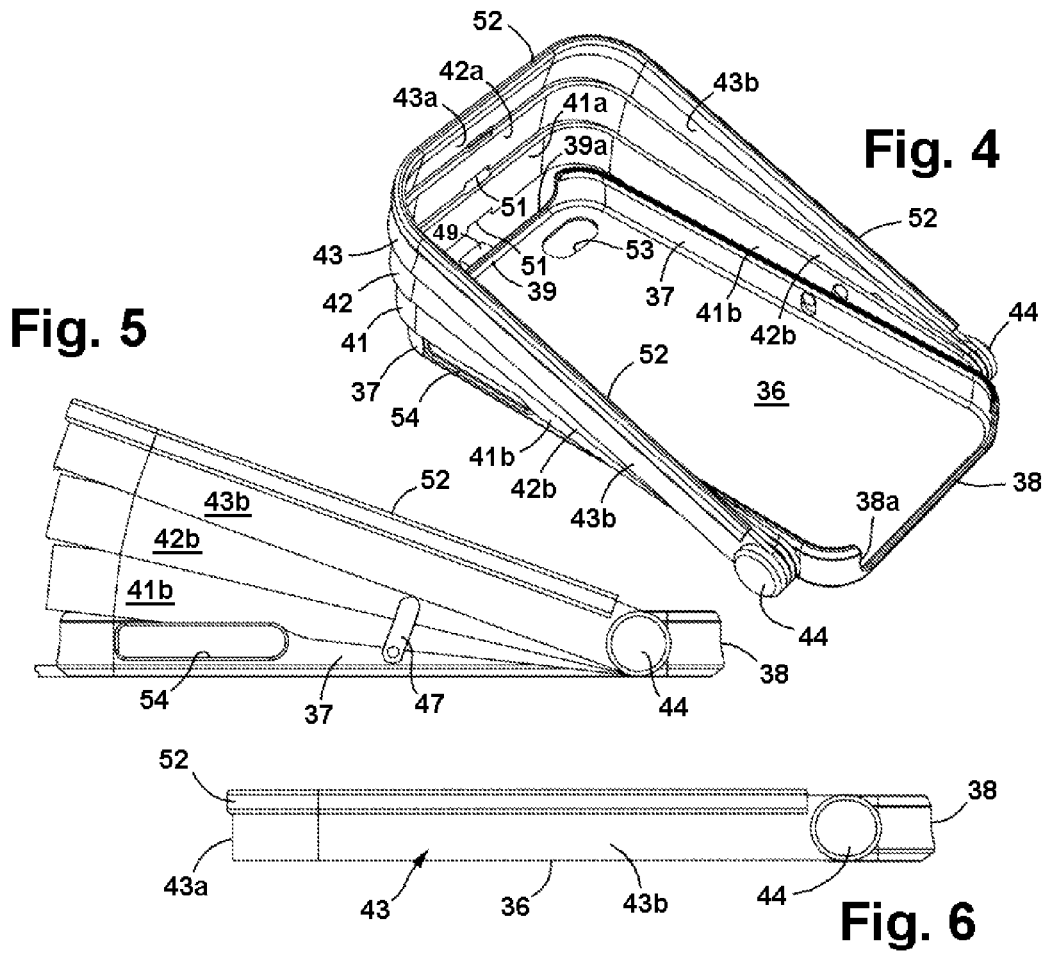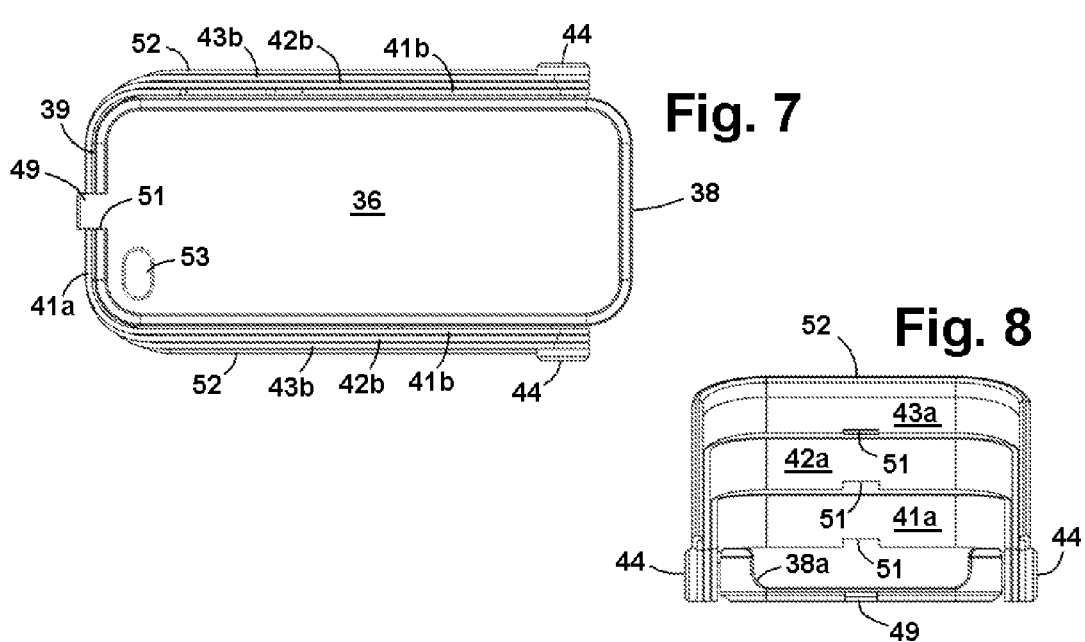

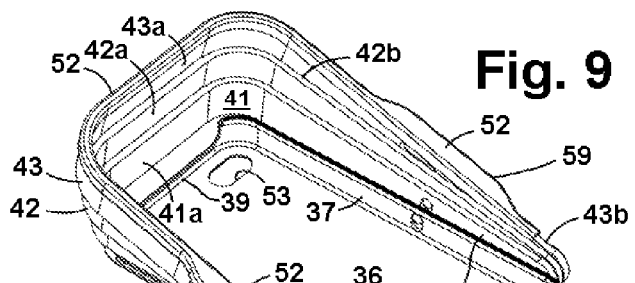
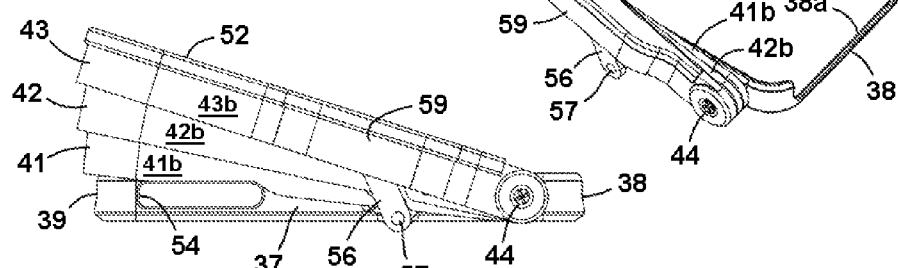
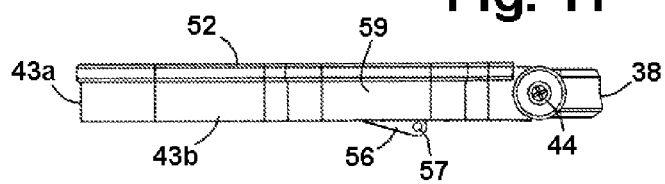
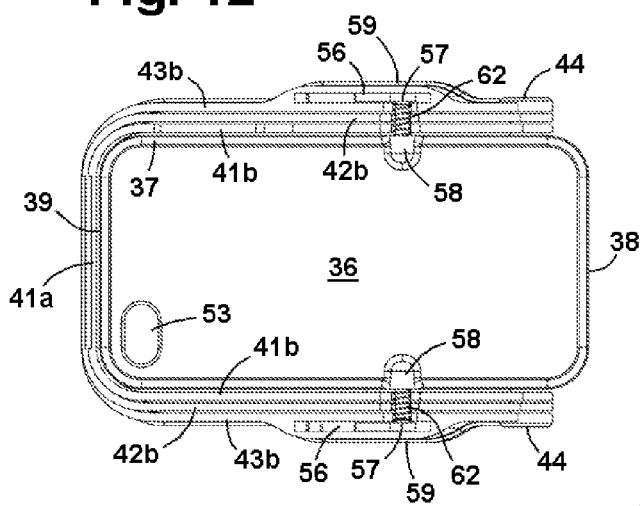
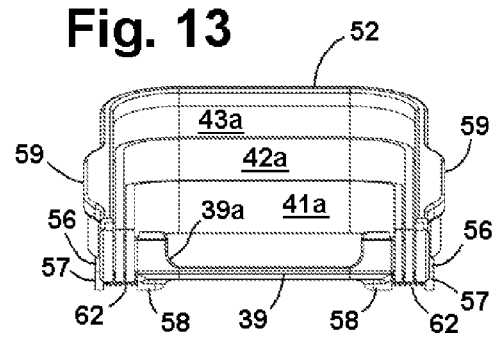

CELL PHONE CRADLE

BACKGROUND OF THE INVENTION

1. Field of Invention

This invention pertains generally to cellular telephones and, more particularly, to a cradle for use in holding a cell phone to the ear.

2. Related Art

Since the advent of cell phones, there has been a concern about possible brain damage resulting from the electromagnetic radiation emanating from them. Although the level of electromagnetic radiation may be relatively low, the antenna emitting it is quite close to the brain, and there is also concern that the radiation can have a cumulative effect.

When some cell phone are used for a just a few minutes, they heat up to such a degree that they cause discomfort to the ear against which they are held. Moving the phone away from the ear to relieve that problem makes it more difficult to hear what is being said, and holding the phone away from the ear can also be uncomfortable since there is no support for the arm and hand holding the phone.

OBJECTS AND SUMMARY OF THE INVENTION

It is, in general, an object of the invention to provide a new and improved cradle for use in holding a cell phone to the ear.

Another object of the invention is to provide a cradle of the above character which makes the use of a cell phone safer, more comfortable, and more convenient.

These and other objects are achieved in accordance with the invention by providing a cell phone cradle that keeps a cell phone away from the head when it is held up to the ear. The cradle has a first end with a height corresponding to the thickness of the cell phone, a second end with a height substantially greater than the thickness of the cell phone, and tapered sides forming an enclosure having an open top and a depth which increases from one end to the other. The cell phone is placed in the cradle with the speaker in the deeper end so that the cell phone is spaced away from the head when the open side of the enclosure is held against the head with the speaker opposite the ear.

BRIEF DESCRIPTION OF THE DRAWINGS

FIG. 4 is an isometric view of another embodiment of a cell phone cradle according to the invention.

FIG. 5 is a side elevational view of the embodiment of FIG. 4 in an expanded state.

FIG. 6 is a side elevational view of the embodiment of FIG. 4 in a collapsed state.

FIG. 7 is a bottom plan view of the embodiment of FIG. 4.

FIG. 8 is a rear elevational view of the embodiment of FIG. 4.

FIG. 9 is an isometric view of another embodiment of a cell phone cradle according to the invention.

FIG. 10 is a side elevational view of the embodiment of FIG. 9 in an expanded state.

FIG. 11 is a side elevational view of the embodiment of FIG. 9 in a collapsed state.

FIG. 12 is a bottom plan view of the embodiment of FIG. 9.

FIG. 13 is a rear elevational view of the embodiment of FIG. 9.

DETAILED DESCRIPTION

Figure 1:
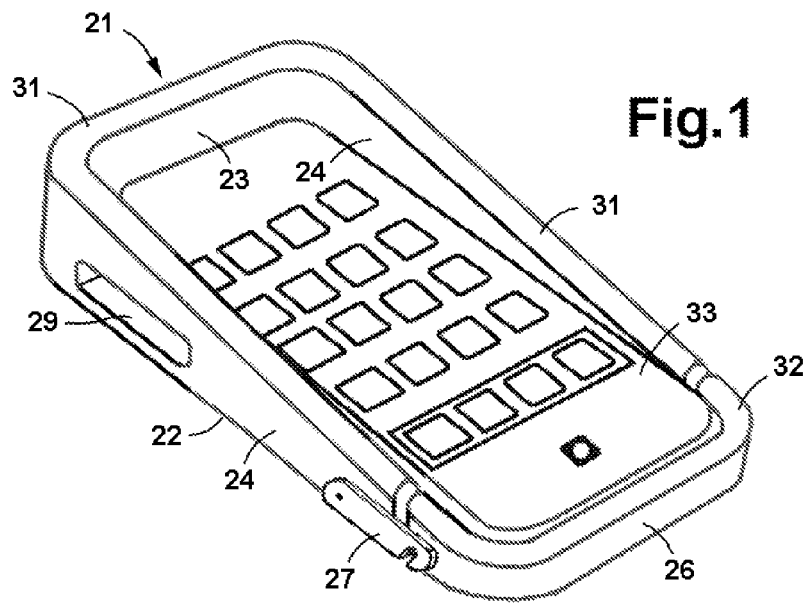
FIG. 1 is an isometric view of one embodiment of a cradle for use in holding a cell phone up to the ear in accordance with the invention.

In the embodiment of FIG. 1, the cradle 21 is formed as a unitary structure of a somewhat flexible material such as foam rubber which will retain the shape to which it is formed. The cradle has a bottom wall 22 with an upper surface that is generally coextensive with the cell phone to be held, a rear end wall 23, side walls 24, and an end wall or flap 26 hingedly connected to the bottom wall at the front of the cradle. The side walls are tapered and increase in height from the thickness of the cell phone at the open end to about 3 inches at the closed end, and the front wall or flap is held in an upright or closed position by latch hooks 27.

Openings 29 are formed in the side and/or end walls to provide access to connectors and controls on the cell phone. Although only one such opening is shown in the embodiment illustrated, it will be understood that similar openings can be provided wherever they are needed for a particular phone.

A generally U-shaped cushion 31 extends along the upper edges of side walls 24 and rear wall 23 for engagement with the side of the head of a person who is holding the phone up to his ear, and a similar cushion 32 of shorter length extends along the upper edges of front wall 26.

Figure 2:
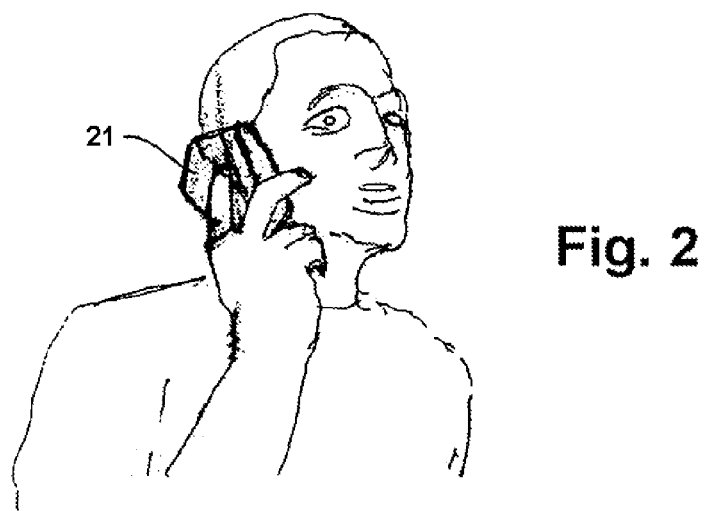
FIGS. 2 and 3 are isometric views showing the embodiment of FIG. 1 in use.

In use, a cell phone 33 is placed in the cradle and secured in place by the retaining flap, with the microphone toward the relatively shallow front end and the speaker toward the relatively deep rear end. When a person holds the cell phone up to his ear in the cradle, as illustrated, for example, in FIG. 2, the cushioning on the upper edges of the end and side walls engages the side of the head, and the cradle maintains the phone at a distance on the order of 2.5 inches, or more, from the ear.

Having the phone spaced a safe distance from the head protects the head from radiation and heat from the phone. The cushioning provides a comfortable contact area for a person using the phone, and it also forms a seal around the ear which keeps out external sounds and noises while containing the sound coming from the speaker. With the speaker and the ear in an essentially closed chamber, it is much easier to hear and understand what is being said over the phone.

Figure 3:
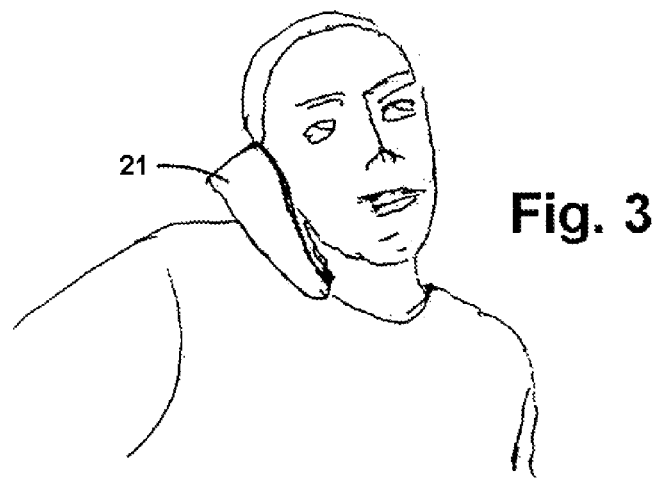

The cradle also facilitates holding the phone up to the head with a shoulder, as illustrated in FIG. 3. Being substantially larger than a cell phone, the cradle can be held securely between the shoulder and the side of the head, whereas a cell phone by itself generally cannot be held in that manner. Thus, the cradle provides hands-free operation of a cell phone where it otherwise might not be possible.

FIGS. 4-8 illustrate an embodiment of the cell phone cradle which is particularly suitable for mobile use, whereas the embodiment of FIG. 1 is more suitable for use in stationary settings such as homes and offices. In this embodiment, the cradle is substantially smaller than in the embodiment of FIG. 1 and is collapsible, making it easy to carry about.

As illustrated in FIGS. 4-8, the cradle has a generally rectangular base 34 with a bottom wall 36, side walls 37, a front end wall 38, and a rear end wall 39. The base is preferably fabricated of a relatively rigid material such as plastic or a light weight metal and formed as a unitary structure. The bottom wall is coextensive in lateral dimension with the cell phone to be held, and the end and side walls all have a height somewhat greater than the thickness of the phone, with the end walls having openings 38a, 39a to provide access to connectors and/or controls on the phone.

A plurality of U-shaped wall sections 41-43 are nested about and pivotally attached to the base by pins 44 for movement between the extended position shown in FIGS. 4 and 5 and the collapsed position shown in FIG. 6. Each of the wall sections has a rectangular end section designated by the suffix "a" and a pair of rectangular side sections designated by the suffix "b", with the pivot pins near the free ends of the side sections toward the front of the base. The U-shaped wall sections are substantially equal in height to the end and side walls of the base, but are of progressively greater lateral dimension such that they nest together with each other and with the base. Thus, the inner length of end wall section 41a is slightly greater than the outer length of end wall 27, and the inner length of side wall sections 41b is slightly greater than the outer length of side walls 28. Similarly, the inner length of end wall section 42a is slightly greater than the outer length of end wall section 41a, and the inner length of side wall sections 42b is slightly greater than the outer length of side wall sections 41b. Likewise, the inner length of end wall section 43a is slightly greater than the outer length of end wall section 42a, and the inner length of side wall sections 43b is slightly greater than the outer length of side wall sections 42b.

Props or braces 47 are rotatably mounted on opposite sides of the base for engagement with the lower edges of side wall sections 43b to hold the wall sections in the extended position, and a tab 49 extends from the rear edge of the bottom wall of the base for engagement with notches 51 in the lower edges of rear wall sections 41a-43a to lock the wall sections in the collapsed position.

A cushion 52 extends along the upper edge of wall section 43 for engagement with the side of the head of a person who is holding the phone up to his ear, and openings 53, 54 are formed in the bottom and side walls of the base to provide access to connectors and controls on the cell phone.

The cell phone is placed in the base section of the cradle with the microphone toward front wall 38. With wall sections 41-43 in the collapsed position, the cell phone and cradle are readily carried together in a pocket or purse, and they can be kept in a protective case (not shown), if desired.

To use the cell phone, wall sections 41-43 are swung upwardly about pivot pins 44 to their extended positions and held there by engaging props 47 with the lower edges of side wall section 43b. In the extended position, the side walls have a generally triangular shape and, together with the extended end wall, form an enclosure which increases in height from the front of the cradle toward the rear. When the phone is held up to the ear with cushion 52 against the side of the head, the phone is spaced away from the head, and the speaker and ear are in a substantially closed chamber, as in the embodiment of FIG. 1. When a person is done using the phone, he can return the cradle to the collapsed state by disengaging the props from the wall sections and swinging the wall sections down about the base, with tab 49 engaging the notches to hold the wall sections in the collapsed position.

The embodiment illustrated in FIGS. 9-13 is generally similar to the embodiment of FIGS. 4-8, and like reference numerals designate corresponding elements in the two. In the embodiment of FIGS. 9-11, means is provided for urging the cradle toward the extended position. This means includes crank arms 56 which are rotatably mounted on short axles or pins 57 mounted in bosses 58 on the lower side of bottom wall 36 on opposite sides of the cradle. The outer ends of the crank arms are slidably connected side wall sections 43b within fenders 59 which extend laterally from those sections. The wall sections are moved to their extended positions by clock springs 62 which are disposed coaxially about pins 57 and connected at their ends to the mounting bosses and to the crank arms. The springs urge the outer ends of the crank arms to swing in an upward direction, lifting the wall sections to their extended or raised positions. The wall sections are returned to the collapsed position by pressing down on them against the force of the springs.

Figure 14:
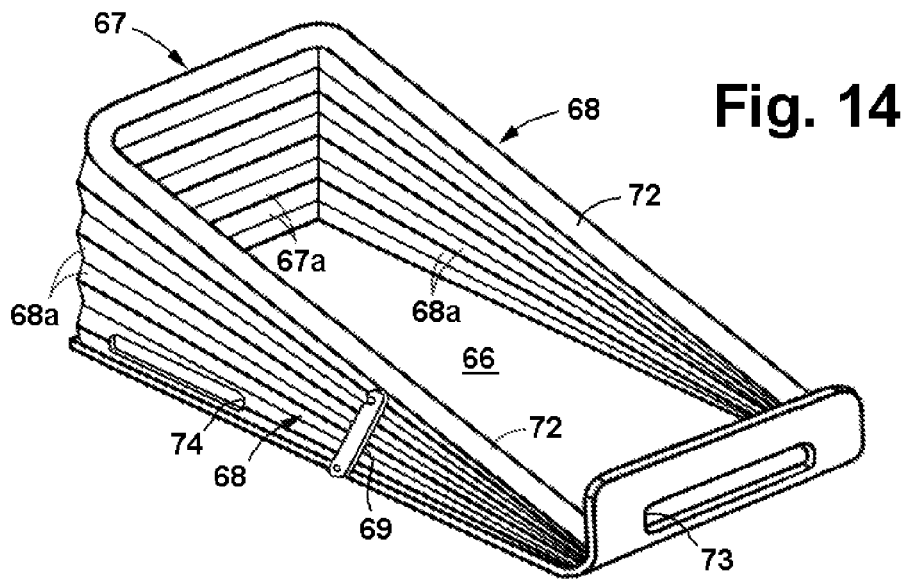
FIG. 14 is an isometric view of another embodiment of a cell phone cradle according to the invention.
Figure 15:
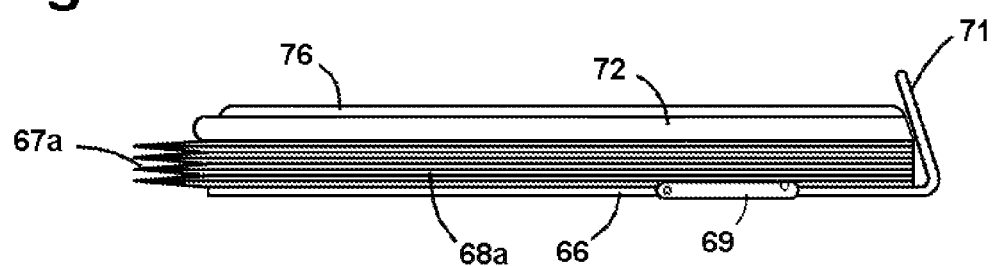
FIG. 15 is a side elevational view of the embodiment of FIG. 14 in its collapsed state.

FIGS. 14 and 15 illustrate another embodiment in which the cradle is collapsible. In this embodiment, the cradle has a generally rectangular bottom wall 66 which can be either flexible or rigid, and fanfolded rear and side walls 67, 68 which can be extended for use and collapsed for storage and carrying, with a latch hook 69 for holding the walls in the extended position. Rear wall 67 has a plurality of generally rectangular panels or pleats 67a, and side walls 68 each have a plurality of generally triangular panels or pleats 68a with the apices of the triangles toward the front of the cradle. A front wall or retainer 71 extends upwardly and rearwardly from the front portion of bottom wall 66 for holding a cell phone in place in the cradle.

A cushion 72 extends along the upper edges of rear wall 67 and side walls 68 for engagement with the head of a person holding the phone up to his ear. Openings 73, 74 are formed in the front flap and in the lowermost panel of one of the side walls to provide access to connectors and controls on the cell phone.

A cell phone 76 is placed in the cradle with its microphone toward the front and its speaker toward the rear of the cradle. With the end and side walls collapsed against the bottom wall, as shown in FIG. 15, the cell phone and cradle are readily carried together in a pocket or purse, and they can be kept in a protective case (not shown), if desired.

To use the cell phone, rear wall 67 and side walls 68 are extended, as shown in FIG. 14, and latch 69 is engaged to hold the walls in their extended positions. In the extended position, the side walls have a generally triangular shape and, together with the extended end wall, form an enclosure which increases in height from the front of the cradle toward the rear. When the phone is held up to the ear with cushion 72 against the side of the head, the phone is spaced away from the head, and the speaker and ear are in a substantially closed chamber, as in the other embodiments. When a person is done using the phone, he can return the cradle to the collapsed state by pushing the walls back down against the bottom wall.

The invention has a number of important features and advantages. It keeps a cell phone a safe distance away from the head and permits the cell phone to be used in a hands-free manner, thereby reducing the risk of brain damage caused by electromagnetic radiation from the phone. It also effectively amplifies the sound heard from the phone by keeping it in a closed chamber with the ear, and the closed chamber also prevents external sounds and noises from reaching the ear, thereby making the sound from the phone louder, clearer, and easier to understand.

It is apparent from the foregoing that a new and improved cradle for holding a cell phone to the ear has been provided. While only certain presently preferred embodiments have been described in detail, as will be apparent to those familiar with the art, certain changes and modifications can be made without departing from the scope of the invention as defined by the following claims.

The invention claimed is:
1. A cradle for a cell phone, comprising a base section having dimensions corresponding to the back side of the cell phone for receiving the cell phone with the microphone and speaker in the cell phone positioned toward opposite ends of the base section, a first end wall at the microphone end of the base section having a height corresponding to the thickness of the cell phone, and a plurality of U-shaped wall sections which are nested together and pivotally connected to the base section near the first end wall to form a second end wall and side walls that can be moved between a collapsed position having a height corresponding to the thickness of the cell phone and an extended position having a height that increases from the first end wall to a height substantially greater than the thickness of the cell phone at the speaker end of the base section, with the base section and walls forming a chamber having an open top and a depth which increases from the microphone end to the speaker end so that when the cell phone is cradled snugly against the base section and walls of the cradle and the open side of the cradle is held against the head with the speaker in registration with the ear, the speaker will be spaced away from the head.

2. The cell phone cradle of claim 1 including cushioning on the top edges of the second end wall and the side walls for engagement with the head when the cell phone is held up to the ear.

3. The cell phone cradle of claim 1 wherein the second end wall and the side walls are fabricated of a material with pleats that are pressed flat against each other when the walls are collapsed.

4. A cradle for use in holding a cell phone up to the ear, comprising: a generally rectangular base having end and side walls of a height corresponding to the thickness of the cell phone, a plurality of U-shaped wall sections nested about the side walls and one end wall of the base, and means pivotally connecting the free end portions of U-shaped wall sections to the side walls of the base near the other end wall for movement between an extended position in which the closed end portions of the wall sections are raised progressively further from the base and a collapsed position in which the upper edges of the wall sections are substantially flush with the upper edges of the end and side walls of the base.

5. The cell phone cradle of claim 4 including a cushion extending along the upper edge of the outermost one of the frame sections.

6. The cell phone cradle of claim 4 wherein the wall sections are of substantially uniform height.

7. A cradle for use in holding a cell phone up to the ear, comprising: a base having a generally rectangular bottom wall for receiving a cell phone and a tab at one end of the bottom wall for retaining the cell phone in the cradle, side walls extending from opposite sides of the bottom wall having a plurality of triangular pleats that can be folded flat against each other in a collapsed position and unfolded to form triangular walls of substantially greater height at the end of the base opposite the tab, and an end wall extending between the ends of the side walls opposite the tab having a plurality of generally rectangular pleats that are folded flat against each other and unfolded to extend the end wall as the side walls are collapsed and extended.

8. The cell phone cradle of claim 6 including a cushion extending along the upper edges of the end wall and the side wall.

9. The cell phone cradle of claim 1 wherein the first end wall has a height on the order of 0.5 inch, and the second end wall has a height on the order of 3.0 inches.

* * * * *